Sept. 4, 1951      H. E. EKORNAAS      2,566,605
RADIATOR GRILL SHIELD FOR MOTOR VEHICLES Filed Feb. 27, 1948

INVENTOR.
Hilmar E. Ekornaas
BY
John N. Randolph
Attorney.

Patented Sept. 4, 1951

2,566,605

UNITED STATES PATENT OFFICE 2,566,605

RADIATOR GRILL SHIELD FOR MOTOR VEHICLES

Hilmar E. Ekornaas, Kenosha, Wis.

Application February 27, 1948, Serial No. 11,812

1 Claim. (Cl. 257—132)

This invention relates to a grill shield for shutting off the grill openings which communicate with the radiators of modern automobiles and is especially intended and adapted for use in cold weather or for very dusty driving to exclude a part or all of the cold or dust laden air which is normally admitted to the radiator and engine through the openings of the radiator grill.

More particularly, it is an aim of the present invention to provide a grill shield of extremely simple construction capable of being readily mounted in or removed from the elongated radiator grill openings of modern motor vehicles and which will effectively function for its intended purpose and at the same time will not be unsightly as is commonly the case with grill covers now used.

Still a further aim of the invention is to provide a grill shield formed of a plurality of sections which are selectively applied or removed so that any desired amount of cold air may be excluded from passing through the radiator grill depending upon temperatures being encountered.

Still another object of the invention is to provide a grill shield which may be very quickly and easily applied or removed and which will not require the employment of separate fastenings for attaching the shield other than those carried by the individual sections thereof.

Various other objects and advantages of the invention will hereinafter become more fully apparent from the following description of the drawing, illustrating a preferred embodiment thereof, and wherein.

Figure 1:
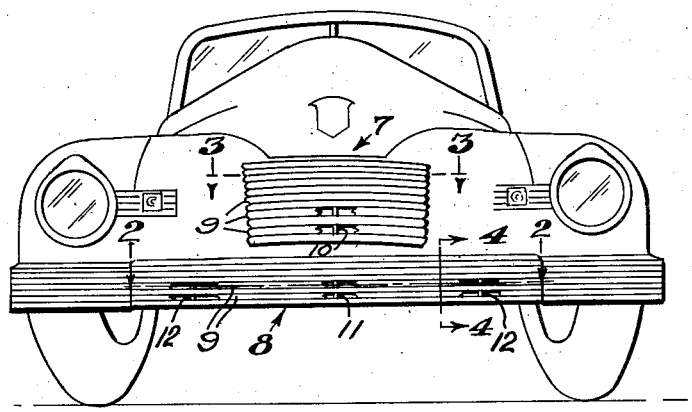
Figure 1 is a front elevational view of one make of modern motor vehicle and showing the grill shield applied thereto.

Referring more specifically to the drawing, for the purpose of illustrating one application and use of the grill shield, hereinafter to be decribed, Figure 1 shows a modern make of car in front elevation provided with a top radiator grill section 7 and a bottom radiator grill section 8. The sections 7 and 8 each include vertically spaced grill bars 9 which extend horizontally and transversely across portions of the front end of the vehicle and as clearly seen in Figure 1 the upper grill section 7 is substantially narrower than the lower grill section 8. The upper grill section 7 has the vertically spaced bars 9 thereof connected intermediate of their ends by a vertically extending rod 10 and the lower, longer grill section 8 has its vertically spaced rods 9 connected by an intermediate rod 11 and two vertical rods 12, one of which is disposed adjacent each end of said section 8. Obviously, the shape and size of the grills of different makes of automobiles will vary and accordingly the size of the grill shield will likewise vary in accordance therewith but without affecting the structure thereof other than a change of size and possibly a slight variation in shape to conform with the grill with which the shield is utilized.

In the embodiment of the invention as illustrated wherein the grill shield is adapted to be used with the grill sections 7 and 8, said shield comprising the invention, is designated generally 14 and is composed of short shield sections or bars, each designated generally 15 and which are adapted to be applied to the grill section 7 and longer shield sections or bars 16 which are adapted to be applied to the lower grill section 8.

Figure 3:
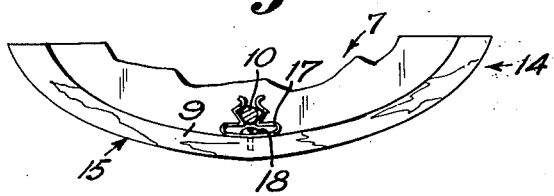
Figure 3 is a similar view taken substantially along a plane as indicated by the line 3—3 of Figure 1.
Figure 4:
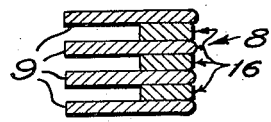
Figure 4 is a vertical sectional view taken substantially along a plane as indicated by the line 4—4 of Figure 1.
Figure 6:
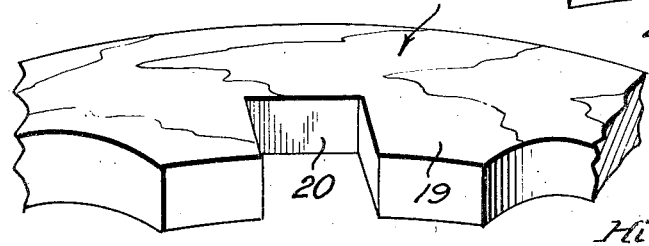
Figure 6 is a similar view of another portion thereof.
Figure 5:
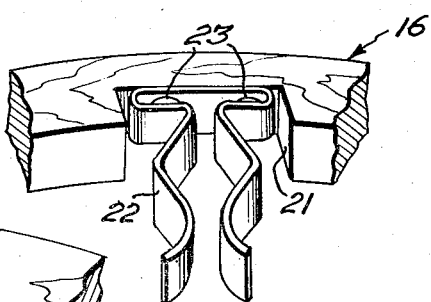
Figure 5 is an enlarged fragmentary perspective view of a portion of one of the shield sections.

Each of the shield sections or bars 15 includes an elongated bar as seen in Figure 3 which is curved or bowed throughout its length and which is of approximately the same length as the bars 9 of the grill section 7 and which is curved to substantially conform to the curvature thereof. The veritcal width of each bar 15 is slightly less than the difference between the grill bars 9 of the grill section 7 so that the shield bars or sections 15 fit into the spaces therebetween. A spring clip 17 has its base disposed against and secured to the inner, concave edge of each shield bar 15 by one or more fastenings 18. Each of said spring clips 17 projects inwardly or from said inner concave edge of the bar 15 of which it forms a part and includes two spaced jaws which are yieldably disposed relatively to one another and which are provided with recessed intermediate portions to yieldably engage the rod 10. As best seen in Figure 3, the terminal portions of the legs of each clip 17 are flared outwardly for guiding said clip into engagement with the rod 10 as the strip or bar 15 is applied and said intermediate portion which engages the rod 10 is shaped so as to be readily disengaged therefrom by an outward pull being exerted on the bar or strip 15 for detaching it from the grill section 7 and which will cause the legs or jaws of the clip 17 to be spread by their camming engagement with the rod 10. It will thus be readily apparent that the grill shield 14 will include five bars or strips 15 for the grill section 7 each of which is applied and removed individually so that all or a part of the openings of the grill section 7 may be closed for excluding cold or dust laden air.

Figure 2:
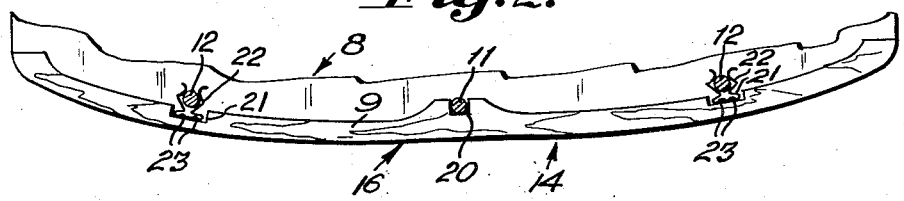
Figure 2 is a horizontal sectional view taken substantially along a plane as indicated by the line 2—2 of Figure 1.

The shield bars or strips 16 as best illustrated in Figure 2 are longer than the bars or strips 15 and are likewise curved longitudinally but to a lesser degree than the strips 15 to conform with the curvature of the grill bars 9 of the grill section 8. Each bar or strip 16, intermediate of its ends, has its inner, concave edge thickened as seen at 19 and said thickened portion is provided with a central recess or notch 20 to accommodate the center rod 11 and by means of which the bars or strips 16 can be centered with respect to the grill section 8. The inner edge of each bar or strip 16 is also recessed as seen at 21 adjacent each end thereof and each of the recesses 21 is adapted to accommodate the base portion of a spring clip 22 which is secured therein preferably by two fastenings 23. The spring clips 22 correspond to the spring clips 17 and are adapted to engage one with each of the rods 12 when the bar or strip 16 is applied to an opening or space between two adjacent grill bars 9 of the section 8 and said spring clips 22 are engaged with and disengaged from the rods 12 in the same manner as previously described with reference to the spring clips 17 and rod 10. It will be noted that the grill section 8 comprises four grill rods 9 defining three openings or spaces so that the shield 14 is provided with three bars or strips 16 for use with the grill section 8 and each of which may be separately applied and removed for closing or partly closing the opening afforded by said grill section 8.

The bars or strips 15 and 16 forming the shield 14 may be formed of any suitable material such as wood, metal or plastic and may be made in various colors to conform to the color of the body of the vehicle with which they are to be utilized or to otherwise blend therewith or with the radiator grill thereof.

As previously stated, the size, shape and number of parts constituting the shield 14 will vary for different makes of motor cars having radiator grills of different sizes and shapes and the shield 14 can be readily modified, without invention to adapt it for use with substantially all modern motor vehicle radiator grills and will effectively function for its intended purposes as previously set forth.

Various other modifications and changes are likewise contemplated and may obviously be resorted to, without departing from the spirit or scope of the invention as hereinafter defined by the appended claim.

I claim as my invention:

A radiator grill shield comprising a plurality of elongated, substantially rigid strips adapted to be selectively applied to or removed from the slots defining the spaces between the bars of a radiator grill and corresponding substantially to the curvature of said bars for closing said slots, each of said strips having a thickened inner edge portion intermediate of its ends provided with a notch adapted to engage a central rod of the grill for centering the strip relatively thereto, and said strip being provided with spring clips adjacent each end thereof for resiliently and releasably engaging other rods of the grill for detachably retaining the strips in the slots thereof.

HILMAR E. EKORNAAS.

REFERENCES CITED

The following references are of record in the file of this patent:

UNITED STATES PATENTS

| Number | Name | Date |
|---|---|---|
| 1,855,256 | O'Brien | Apr. 26, 1932 |
| 1,855,492 | Shaw | Apr. 26, 1932 |
| 1,960,629 | Green | May 29, 1934 |
| 2,131,874 | Griffin | Oct. 4, 1938 |